(12) United States Patent
Iwahara et al.

(10) Patent No.: US 11,052,839 B2
(45) Date of Patent: Jul. 6, 2021

(54) BINDING STRUCTURE OF WIRE ROUTING MATERIAL, AND ENGAGING MEMBER

(71) Applicants: DAIWA KASEI INDUSTRY CO., LTD., Okazaki (JP); TOYOTA JIDOSHA KABUSHIKI KAISHA, Toyota (JP)

(72) Inventors: Toshio Iwahara, Okazaki (JP); Katsuya Hirakawa, Okazaki (JP); Itsuo Wakabayashi, Seto (JP); Kazunori Takata, Toyota (JP)

(73) Assignees: DAIWA KASEI INDUSTRY CO., LTD., Okazaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/804,338

(22) Filed: Feb. 28, 2020

(65) Prior Publication Data
US 2020/0290531 A1 Sep. 17, 2020

(30) Foreign Application Priority Data
Mar. 13, 2019 (JP) .............................. JP2019-046113

(51) Int. Cl.
*B60R 16/02* (2006.01)
*H01B 7/00* (2006.01)
(Continued)

(52) U.S. Cl.
CPC ....... *B60R 16/0215* (2013.01); *H02G 11/006* (2013.01)

(58) Field of Classification Search
CPC ..... B60R 16/02; B60R 16/0215; H02G 11/00; H02G 3/02; H02G 3/32; H02G 3/30;
(Continued)

(56) References Cited

U.S. PATENT DOCUMENTS 5,106,040 A * 4/1992 Cafmeyer ................ H02G 3/26
248/292.14
6,311,934 B1 * 11/2001 Fujii ......................... F16L 3/04
248/71
(Continued)

FOREIGN PATENT DOCUMENTS

JP H1089329 A * 4/1998 ............. F16B 19/00
JP 2007-282352 A 10/2007
JP 2010252555 A * 11/2010 ............... H02G 3/30

*Primary Examiner* — Timothy J Thompson
*Assistant Examiner* — Guillermo J Egoavil
(74) *Attorney, Agent, or Firm* — McClure, Qualey & Rodack, LLP

(57) ABSTRACT

A binding structure of wire routing materials are formed by: elongated wire routing materials; a binding member for binding the wire routing materials; and an engaging member including a movable body portion including an engaging portion for assembly into a vehicle body, and a bound portion to be bound and held together with the wire routing materials by the binding member. The bound portion includes a main portion facing the wire routing materials, and a leg portion extending from the main portion and being in contact with the wire routing materials. The movable body portion includes a sliding portion disposed such that sliding thereof is allowed on the wire routing materials in a gap.

5 Claims, 5 Drawing Sheets

(51) Int. Cl.
*H01B 7/40* (2006.01)
*H02G 11/00* (2006.01)

(58) Field of Classification Search
CPC ...... H02G 3/0456; H02G 11/006; H01B 7/00; H01B 7/40; H01B 7/0045
USPC .............................................. 174/72 R, 72 A
See application file for complete search history.

(56) References Cited

U.S. PATENT DOCUMENTS

| | | | |
|---|---|---|---|
| 9,281,636 B1* | 3/2016 | Schmitt | H01R 13/7172 |
| 2005/0051676 A1* | 3/2005 | Del Sordo, Jr. | F16L 3/233 |
| | | | 248/74.3 |
| 2015/0048221 A1* | 2/2015 | Doushita | H02G 3/04 |
| | | | 248/71 |
| 2020/0119536 A1* | 4/2020 | Tokunaga | F16G 11/00 |
| 2020/0215999 A1* | 7/2020 | Yamamoto | B60R 16/0215 |
| 2021/0031709 A1* | 2/2021 | Kato | H01B 7/40 |

* cited by examiner

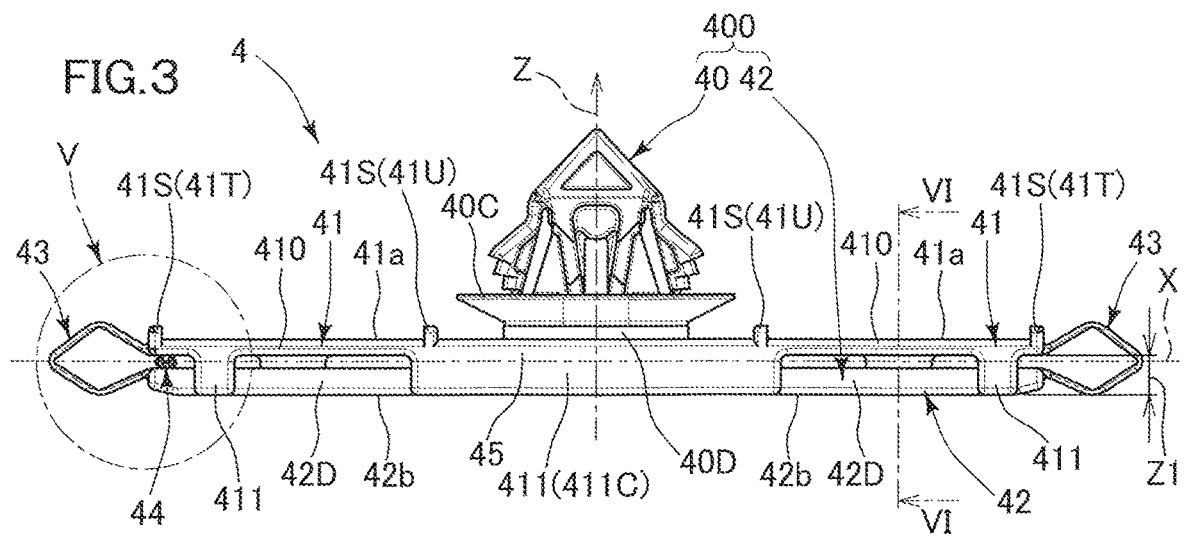
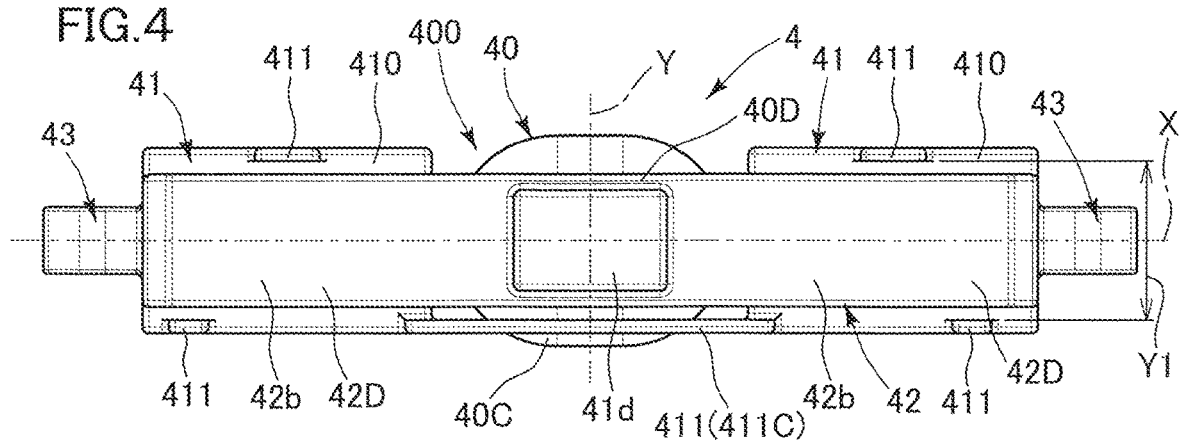
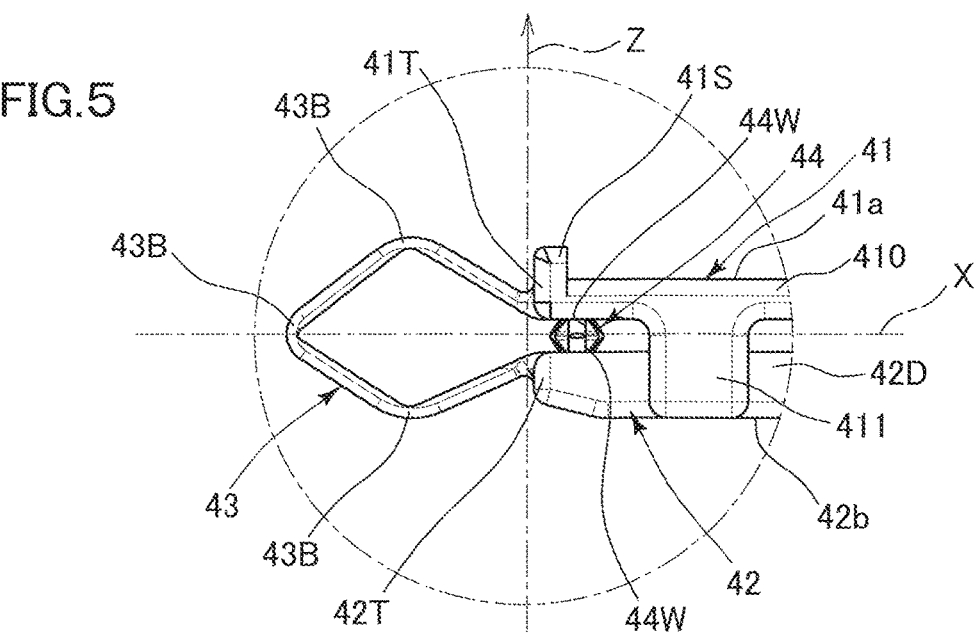

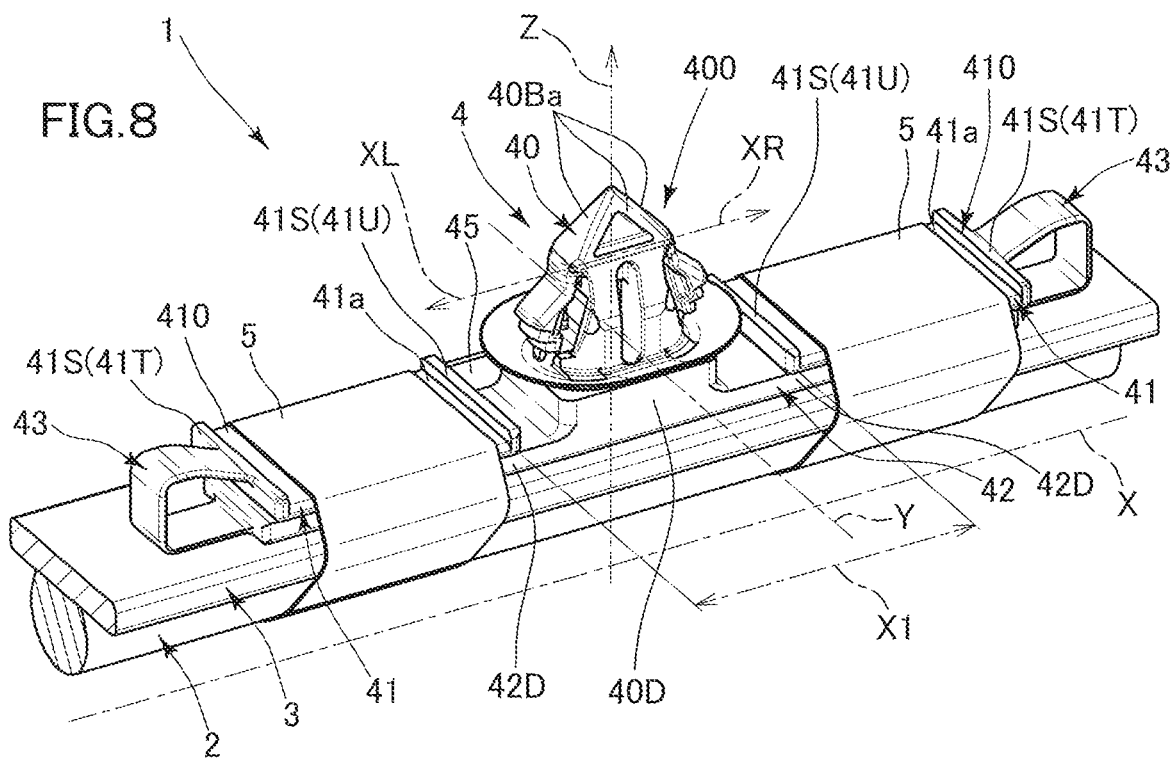
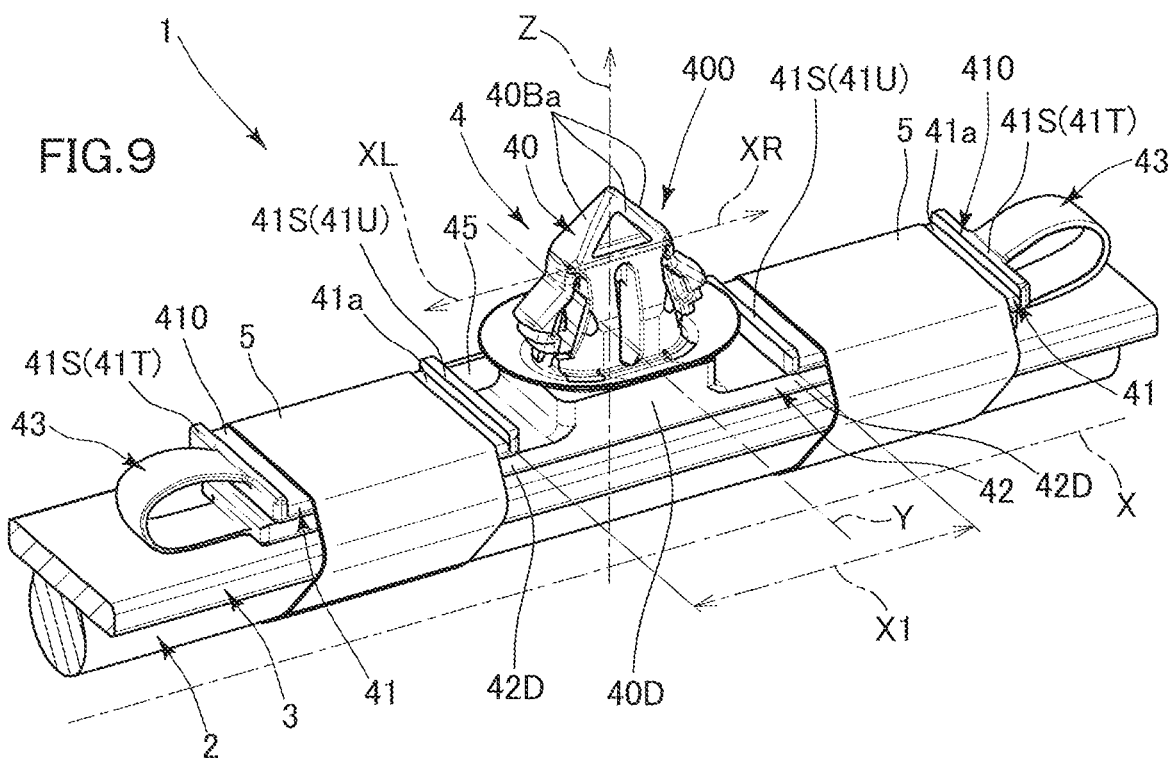

BINDING STRUCTURE OF WIRE ROUTING MATERIAL, AND ENGAGING MEMBER

RELATED APPLICATIONS

This application claims the priority of Japanese Patent Application No. 2019-046113 filed on Mar. 13, 2019. The disclosure of the prior application is hereby incorporated herein in the entirety by reference.

BACKGROUND OF THE INVENTION

Field of the Invention

This invention relates to a binding structure of a wire routing material, and an engaging member to be used therefor.

Description of Related Art

For vehicles, an engaging member such as a clamp described in, for example, Japanese Laid-Open Patent Publication No. 2007-282352 is used to hold a wire harness formed by a wiring group including a signal line and a power supply line, in a binding state, in a vehicle body.

An engaging member is bound and held together with the wire harness by using a belt, tape, or the like, and thus, the engaging member is attached integrally with the wire harness. Then, the engaging member that has been integrated with the wire harness is assembled to the vehicle body by an engaging portion thereof being inserted into a fixing hole of the vehicle body. Such engaging members are attached to the wire harness at respective predetermined positions in the longitudinal direction of the wire harness, and each of the engaging members is inserted and assembled into a fixing hole provided at the corresponding position in the vehicle body.

In recent years, a wire harness constituting a signal line and a flat wire routing material constituting a power supply line may be separately prepared, and wired in the vehicle body. However, when such a flat wire routing material is used, the conventional engaging member has problems as below.

That is, since the conventional engaging member is attached to a flexible wire harness, even if there is a small positional displacement between the engaging portion and the fixing hole of the vehicle body, the displacement can be absorbed by deforming the wire harness, and thus, the engaging portion can be assuredly inserted into the fixing hole of the vehicle body. However, when a flat wire routing material having a high rigidity is employed, the positional displacement cannot be absorbed by deformation. As a result, when the engaging member is to be attached to a wire routing material including a flat wire routing material, the attachment position of the engaging member needs to be strictly managed so that the engaging portion can be assuredly inserted into the fixing hole of the vehicle body. Accordingly, the efficiency of work of attaching the engaging member to the wire routing material including the flat wire routing material could be significantly impaired.

Even when a flexible wire harness is used, it is desired to be able to insert the engaging portion into the fixing hole of the vehicle body more assuredly than before.

An object of this invention is, for wiring a wire routing material in a vehicle body by attaching the wire routing material to an engaging member, to realize a binding structure, of a wire routing material, that allows an engaging portion of the engaging member to be assuredly inserted into a fixing hole of the vehicle body and that is less likely to cause decrease of workability in attaching the engaging member to the wire routing material, and the engaging member to be used in the binding structure.

SUMMARY OF THE INVENTION

In order to attain the aforementioned object, an engaging member includes:
a movable body portion including an engaging portion for assembly into a vehicle body; and
a bound portion configured to be caused to come into a binding and holding state together with a wire routing material in an elongated shape by a binding member, wherein
the bound portion integrally includes
a main portion configured to be pressed, in the binding and holding state, toward the wire routing material side by the binding member, and
a leg portion which, while in the binding and holding state, extends from the main portion and is in contact with the wire routing material to ensure a gap between the main portion and the wire routing material facing the main portion, and
the movable body portion integrally includes the engaging portion, and a sliding portion disposed such that sliding of the sliding portion is allowed on the wire routing material in the gap, and the sliding allows a position of the engaging portion to be moved.

In order to attain the aforementioned object, a binding structure, of a wire routing material, includes:
a wire routing material in an elongated shape;
a binding member configured to bind the wire routing material; and
an engaging member including
a movable body portion including an engaging portion for assembly into a vehicle body, and
a bound portion configured to be caused to come into a binding and holding state together with the wire routing material by the binding member, wherein
the bound portion integrally includes
a main portion configured to be pressed, in the binding and holding state, toward the wire routing material side by the binding member, and
a leg portion which, while in the binding and holding state, extends from the main portion and is in contact with the wire routing material to ensure a gap between the main portion and the wire routing material facing the main portion, and
the movable body portion integrally includes the engaging portion, and a sliding portion disposed such that sliding of the sliding portion is allowed on the wire routing material in the gap, and the sliding allows a position of the engaging portion to be moved relative to the bound portion bound and held together with the wire routing material.

According to the configurations of this invention, even if the wire routing material is strongly bound and held together with the bound portion of the engaging member by the binding member, the movable body portion having the engaging portion can move in the gap between the wire routing material and the bound portion. Thus, the movement allows the engaging portion to be assuredly inserted into the fixing hole of the vehicle body. In the structure, since the movable body portion having the engaging portion can be moved after the engaging member is stably attached to the wire routing material, assembly is facilitated. Further, when the wire routing material being in contact with the leg portion of the bound portion and faced by the main portion is a flat wire routing material, the leg portion can come into stable contact with the flat surface of the flat wire routing material, and further, the movable body portion can easily slide on the flat surface.

The engaging member may include a linking portion configured to link the bound portion and the movable body portion so as to allow relative movement therebetween. With this configuration, the engaging member is formed as a single component in which the bound portion and the movable body portion are integrated. Thus, assembly of the engaging member to the wire routing material is easier than an engaging member in which two components are assembled to be used. For example, the linking portion may be a deformation portion configured to deform in association with the relative movement. With this configuration, due to the bending structure that can be easily formed, relative movement between the bound portion and the movable body portion is facilitated.

The engaging member may be configured to hold the engaging portion at a predetermined initial position and to release holding of the engaging portion in association with movement of the engaging portion from the initial position. With this configuration, a basic position of the engaging portion in the engaging member can be fixedly determined. When insertion assembly into the fixing hole of the vehicle body is performed, the engaging member is assembled to the wire routing material at a predetermined position, such that positional displacement is basically prevented. Therefore, a structure in which the movable body portion can freely move relative to the bound portion of the engaging member could adversely increase difficulty in insertion. In a structure in which the basic position of the engaging portion is fixed and is not displaced, assembly is facilitated when there is no positional displacement with respect to the fixing hole of the vehicle body. Even if there is a positional displacement, the joint portion is easily cut due to movement of the movable body portion. Therefore, the engaging portion can be easily inserted and assembled into the fixing hole which has been displaced.

BRIEF DESCRIPTION OF THE DRAWINGS

FIG. 3 is a front view of FIG. 2;

FIG. 4 is a bottom view of FIG. 2;

FIG. 5 is an enlarged view of a part V in FIG. 3;

FIG. 8 is a perspective view showing a binding structure of a wire routing material according to a second embodiment of this invention; and FIG. 9 is a perspective view showing a binding structure of a wire routing material according to a third embodiment of this invention.

DESCRIPTION OF THE PREFERRED EMBODIMENTS

Hereinafter, a first embodiment of this invention will be described with reference to the drawings.

Figure 1:
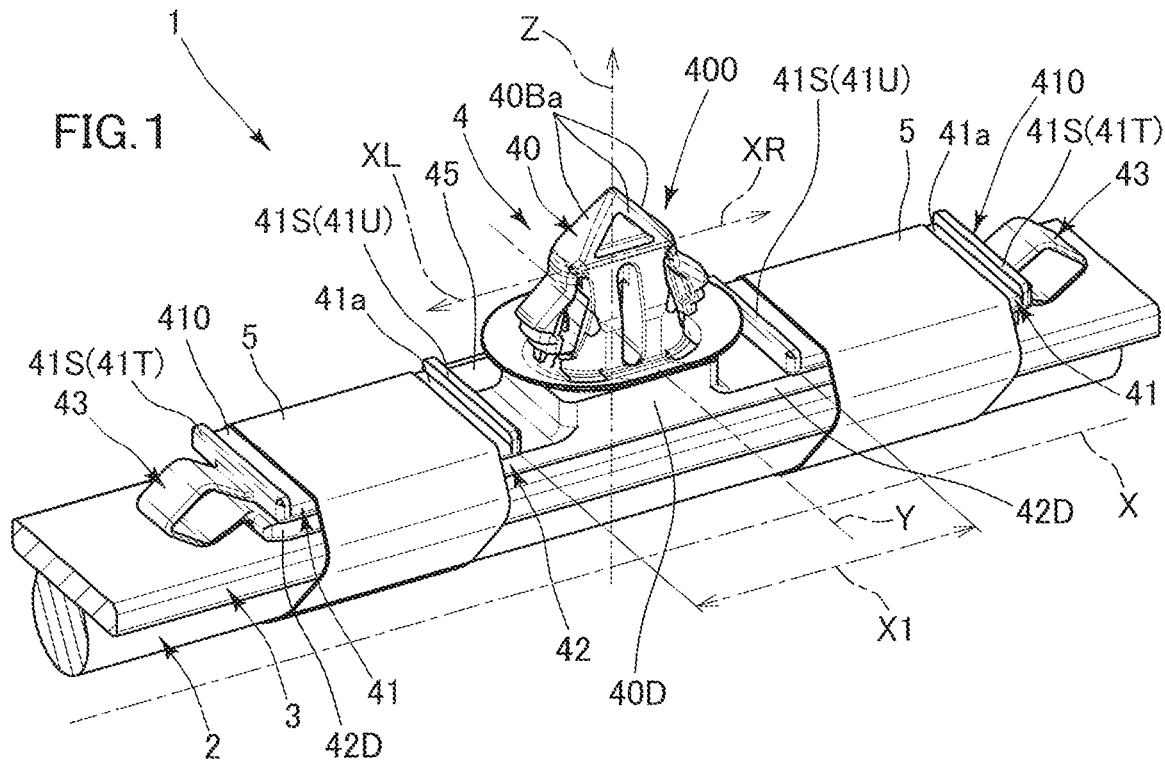
FIG. 1 is a perspective view showing a binding structure of a wire routing material according to a first embodiment of this invention.
Figure 6:
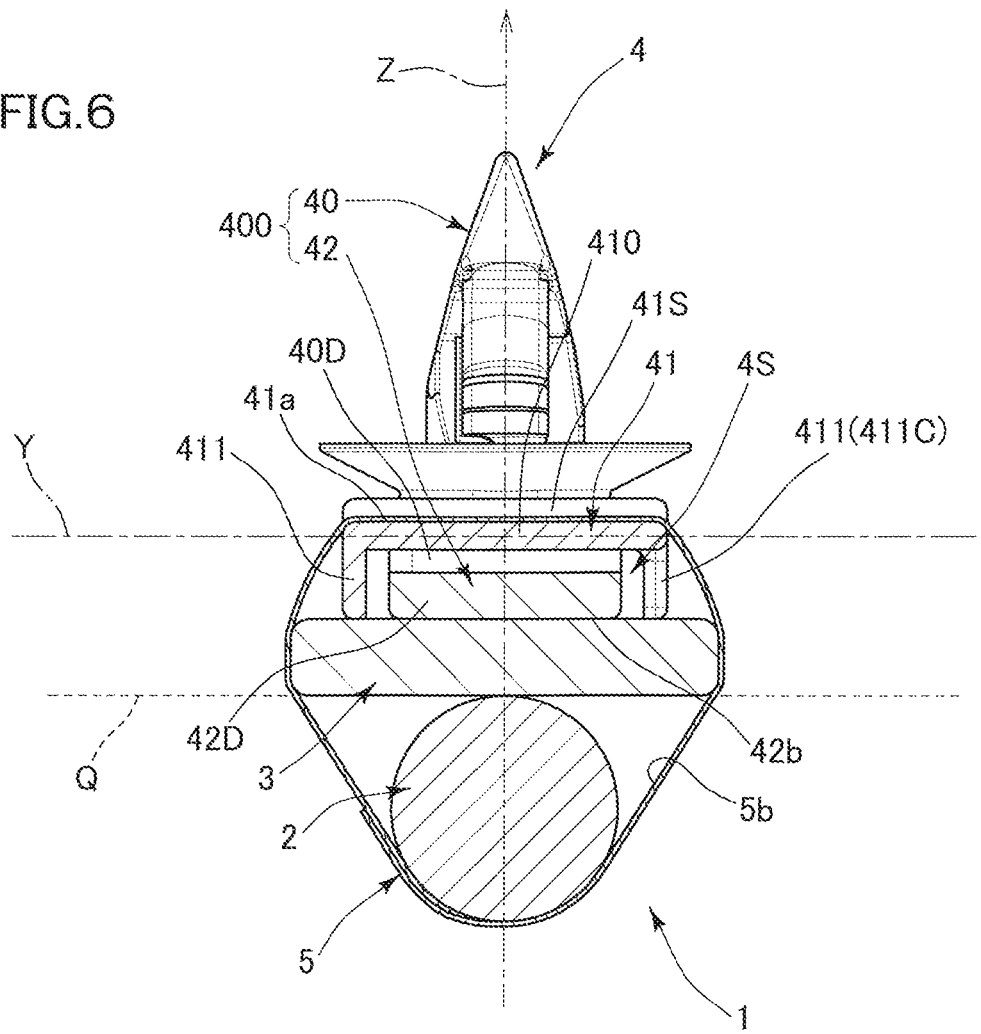
FIG. 6 is a cross-sectional view obtained by cutting FIG. 1 at the position of the VI-VI cross section in FIG. 3.

In this embodiment, as shown in FIGS. 1 and 6, a binding structure 1 of a wire routing material is formed so as to include: a flexible wire routing material 2 constituting a first wire routing material; a plate-shaped flat wire routing material 3 constituting a second wire routing material and having higher rigidity than the flexible wire routing material 2; binding members 5 that bind the wire routing materials 2, 3; and an engaging member 4 that integrally includes an engaging portion 40 for assembly into a vehicle body 100, and bound portions 41 to be bound and held together with the wire routing materials 2, 3 by the binding members 5.

The flexible wire routing material 2 is a flexible member formed by a bundle of a plurality of wires extending in an elongated manner. The flexible wire routing material 2 is a wire harness that forms a signal line. The flexible wire routing material 2 of this invention is not limited to a wire harness.

The flat wire routing material 3 is a member that has a flat-plate-like shape, extends in an elongated manner, and has higher rigidity and lower flexibility than the flexible wire routing material 2. The flat wire routing material 3 is a metal bus bar that forms a power supply line. The flat wire routing material 3 is formed such that four surfaces forming the outer peripheral surfaces are each formed as a flat surface extending in the longitudinal direction of the flat wire routing material 3. The flat wire routing material 3 of this invention may be an FFC (Flexible Flat Cable) that constitutes a flat cable or an FPC (Flexible Printed Circuit), and is not limited to a bus bar.

Figure 2:
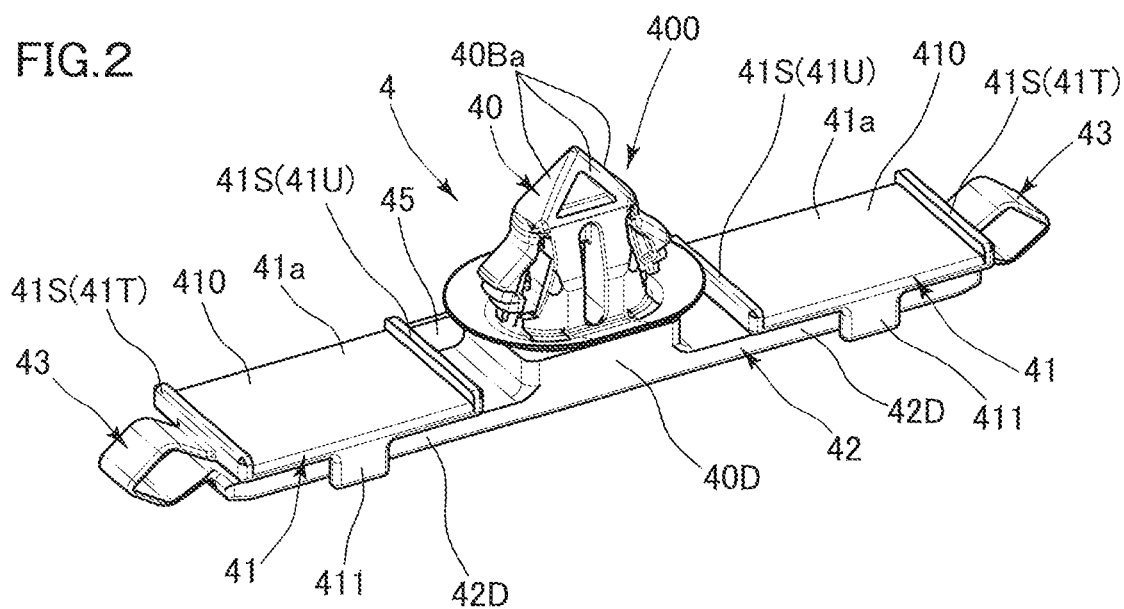
FIG. 2 is a perspective view showing an engaging member in FIG. 1.

As shown in FIGS. 2 to 4, the engaging member 4 includes a movable body portion 400 and the bound portions 41.

Figure 7A:
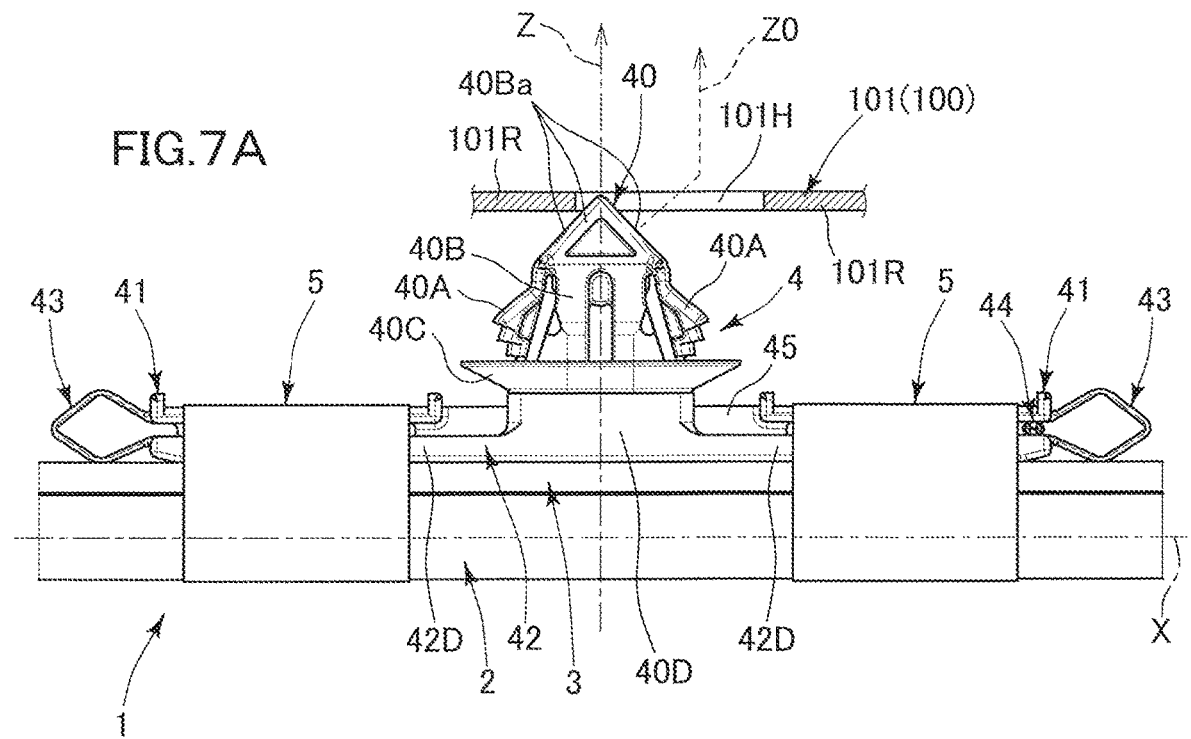
FIG. 7A is a front view showing a state before the engaging member in FIG. 1 is assembled to a vehicle body.
Figure 7B:
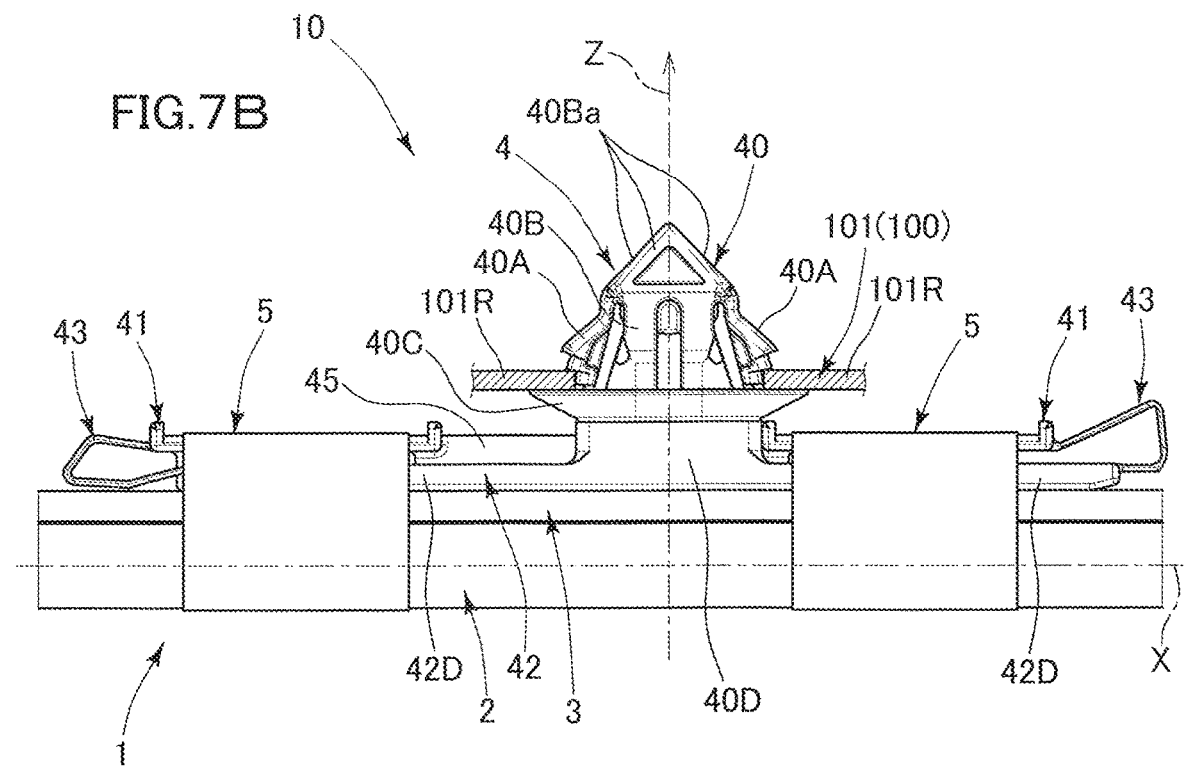
FIG. 7B is a front view showing a state after the engaging member in FIG. 1 is assembled to the vehicle body.

As shown in FIGS. 7A, 7B, the movable body portion 400 includes the engaging portion 40 for assembly into the vehicle body 100.

The engaging portion 40 is an anchor portion that is inserted into a predetermined fixing hole 101H of a fixing portion 101 provided in the vehicle body 100, whereby the engaging portion 40 is engaged with and assembled into the fixing hole 101H so as to come into a locking state. The engaging portion 40 includes a column portion 40B that is inserted into the fixing hole 101H, an elastic locking piece 40A that is inserted into the fixing hole 101H together with the column portion 40B and is engaged, after being inserted, with a peripheral part 101R around the fixing hole 101H so as to come into a locking state, and a contact portion 40C that holds the peripheral part 101R around the fixing hole 101H between the elastic locking piece 40A and the contact portion 40C in the locking state.

The elastic locking piece 40A has a shape that expands from the distal end side (upper side of the column portion 40B in FIGS. 7A and 7B) of the column portion 40B so as to be away from the column portion 40B toward the proximal end side (lower side of the column portion 40B in FIGS. 7A and 7B), and the proximal end side portion is elastically deformable so as to approach the column portion 40B. When inserted into the fixing hole 101H in a predetermined insertion direction Z, the elastic locking piece 40A is pushed inward into the hole by the peripheral part 101R around the fixing hole 101H, and is elastically deformed so as to approach the column portion 40B. However, when inserted into a predetermined position, the elastic locking piece 40A is locked relative to the peripheral part 101R around the fixing hole 101H from the far side (upper side in FIGS. 7A and 7B) in the insertion direction Z, and comes into a locking state in which the elastic locking piece 40A is inhibited from being detached in a direction opposite to the insertion direction Z.

The contact portion 40C has a shape extending in a dish-like form from the proximal end side of the column portion 40B in the insertion direction Z, and comes into contact with the peripheral part 101R around the fixing hole 101H so as to form an annular shape. In the above-described locking state, the contact portion 40C comes into contact with the peripheral part 101R around the fixing hole 101H from the near side (lower side in FIGS. 7A and 7B) in the insertion direction Z, and holds the peripheral part 101R between the elastic locking piece 40A and the contact portion 40C. Consequently, the engaging portion 40 is assembled into the fixing hole 101H so as to come into the locking state, whereby an assembling structure 10 (see FIG. 7B) for the engaging member 4 into the vehicle body 100 is formed. The contact portion 40C also functions to prevent a foreign object (dust, etc.) from entering from the far side (upper side in FIGS. 7A and 7B) in the insertion direction Z of the fixing hole 101H to the near side (lower side in FIGS. 7A and 7B) through the fixing hole 101H.

As shown in FIGS. 1 and 6, each bound portion 41 is an attachment portion for attaching the flat wire routing material 3.

The bound portion 41 is an attachment portion, for the wire routing materials 2, 3, which is bound and held by being enclosed together with the wire routing materials 2, 3 when the wire routing materials 2, 3 are bound by the binding member 5. In a binding and holding state in which the bound portions 41 are bound and held together with the wire routing materials 2, 3 by the binding members 5, the bound portions 41 are positioned on a first side (XR side in FIG. 1) in a longitudinal direction X with respect to the engaging portion 40 of the movable body portion 400 and a second side (XL side in FIG. 1) opposite to the first side.

As shown in FIGS. 2 and 3, each bound portion 41 integrally includes: a main portion 410 that is pressed toward the wire routing materials 2, 3 side by the binding member 5 in the above-described binding and holding state; and a plurality of leg portions 411 that extend from the main portion 410 to the wire routing materials 2, 3 side in the above-described binding and holding state so as to come into contact with the flat wire routing material 3, and ensure a gap 4S (see FIG. 6) between the main portion 410 and the flat wire routing material 3 facing the main portion 410.

The bound portions 41 include: the main portions 410 at both sides with respect to the engaging portion 40 in the longitudinal direction X of the wire routing materials 2, 3; and the leg portions 411 that protrude downward from both end sides in a width direction Y of the main portions 410. The width direction Y is the direction that is orthogonal to both the insertion direction Z of the engaging portion 40 into the fixing hole 101H of the vehicle body 100 and the longitudinal direction X of the wire routing materials 2, 3.

The main portions 410 each have a plate-like shape, and, as shown in FIG. 6, on respective upper surfaces 41*a* thereof, the binding members 5 which are tape members come into close contact with and adhere to the main portions 410. As shown in FIGS. 1 to 3, each main portion 410 has, on both sides in the longitudinal direction X with respect to the corresponding upper surface 41*a*, displacement prevention portions 41S that protrude upward so as to prevent displacement in the longitudinal direction X of the binding member 5 being in close contact with the upper surface 41*a*.

As shown in FIG. 4, the leg portions 411 protrude downward from the center in the longitudinal direction X of each main portion 410 on one side (upper side in FIG. 4) out of both sides in the width direction Y of the main portion 410, and protrude downward from both end sides in the longitudinal direction X of each main portion 410 on the other side (lower side in FIG. 4) in the width direction Y of the main portion 410. Here, three leg portions 411 are provided for each main portion 410, and form a three-point support state in which the respective leg portions 411 are in contact, at three points, with the wire routing material 3. Accordingly, a stable mount state of the engaging member 4 on the wire routing material 3 is ensured.

As shown in FIG. 3, the bound portions 41 are provided with a center linking portion 45 that links the main portions 410 on both sides in the longitudinal direction X. Accordingly, the opposing interval in the longitudinal direction X between the main portions 410 is fixed. The leg portions 411 include a center leg portion 411C that forms a lower end portion of the center linking portion 45 linking the main portions 410. The center leg portion 411C is formed so as to be wider in the longitudinal direction X than the other leg portions 411. The center leg portion 411C is shared as a leg portion 411 of the main portions 410. The center linking portion 45 extends so as to pass below the contact portion 40C of the engaging portion 40, thereby linearly linking the main portions 410. By the contact portion 40C positioned on the upper side (insertion direction Z side) of the center linking portion 45, upward detachment of the bound portions 41 including the main portions 410 is prevented.

As shown in FIG. 1, the binding members 5 bind the bound portions 41 together with the flat wire routing material 3 and the flexible wire routing material 2, on the first side (XR side in FIG. 1) in the longitudinal direction X with respect to the engaging portion 40 of the engaging member 4, and on the second side (XL side in FIG. 1) opposite to the first side. Through this binding and holding, the leg portions 411 of the bound portions 41 are maintained in a state of pressing the flat wire routing material 3 and always being in close contact therewith.

The binding members 5 are flexible elongated members, and are tape members in which surfaces (inner circumferential surfaces in the case of the object to be bound being enclosed) facing the object to be bound as shown in FIG. 6 are adhesive surfaces 5*b*. Each binding member 5 adheres at a portion that contacts with the enclosed object to be bound, and both ends of the binding member 5 overlap and adhere to each other, whereby a binding state is obtained.

The object to be bound by each binding member 5 includes the corresponding bound portion 41 of the engaging member 4, as well as the flat wire routing material 3 and the flexible wire routing material 2. Therefore, when the binding member 5 binds the bound portion 41 together with the flat wire routing material 3 and the flexible wire routing material 2, thereby coming into the above-described binding state, a binding and holding state in which the flat wire routing material 3 and the flexible wire routing material 2 are attached to and held by the engaging member 4 is obtained.

The movable body portion 400 integrally includes a sliding portion 42 together with the engaging portion 40 described above.

The sliding portion 42 is disposed so as to be slidable on the wire routing materials 2, 3, in the gap 4S (see FIG. 6) formed between the main portion 410 and the wire routing material 3. Through this sliding, the engaging member 4 can move the position of the engaging portion 40 relative to the bound portions 41 bound and held together with the wire routing materials 2, 3. Specifically, the engaging member 4 can move in the longitudinal direction X in the gap 4S between the main portion 410 and the wire routing material 3 while being guided by the leg portions 411 on both sides in the width direction Y. Further, the engaging member 4 can slightly move in the gap 4S also in the width direction Y.

As shown in FIGS. 2 to 4, the sliding portion 42 includes a lower end portion 40D of the engaging portion 40 and has plate-like sleeve portions 42D, 42D extending from the lower end portion 40D in the longitudinal direction X. A lower surface 42b, serving as the sliding surface, of the sliding portion 42 is formed as a flat surface. The lower end portion 40D of the engaging portion 40 forms a square-pole-like base portion connected to the proximal end of the dish-like-shaped contact portion 40C and the column portion 40B. In the lower end portion 40D, a recess 41d (see FIG. 4) that is open downward is formed as a thinning portion.

The engaging member 4 includes linking portions 43 that each link the corresponding bound portion 41 and the movable body portion 400 so as to allow relative movement therebetween.

Each linking portion 43 forms a deformation portion that deforms in association with relative movement between the bound portion 41 and the movable body portion 400. As shown in FIG. 5, each linking portion 43 links an outer end portion 41T which is an end portion on the side opposite to the engaging portion 40 of the corresponding bound portion 41, and an outer end portion 42T on the outer side in the longitudinal direction X of the sliding portion 42. The linking portion 43 forms a bending structure in which: the linking portion 43 extends outward in the longitudinal direction X from the outer end portion 41T of the bound portion 41, passes a plurality of bending portions 43B, and is connected to the outer end portion 42T of the sliding portion 42. In each bending portion 43B, a groove that is outwardly recessed is formed on the inner surface side so as to facilitate bending of the linking portion 43. Specifically, the linking portion 43 has a first bending portion 43B at a position reached by the linking portion 43 being extended, from the outer end portion 41T of the bound portion 41, obliquely outwardly toward the insertion direction Z side (upper side in FIG. 5) on the outer side in the longitudinal direction X. Further, the linking portion 43 has a second bending portion 43B at a position reached by the linking portion 43 being extended, from the first bending portion 43B, obliquely outwardly toward the side (lower side in FIG. 5) opposite to the insertion direction Z on the further outer side (left side in FIG. 5) in the longitudinal direction X. Further, the linking portion 43 has a third bending portion 43B at a position reached by the linking portion 43 being returned toward the inner side (right side in FIG. 5) in the longitudinal direction X from the second bending portion 43B and being extended obliquely toward the side (lower side in FIG. 5) opposite to the insertion direction Z. The linking portion 43 links to the outer end portion 42T of the sliding portion 42 at a position reached by the linking portion 43 being extended, from the third bending portion 43B, obliquely toward the insertion direction Z side (upper side in FIG. 5) on the inner side (right side in FIG. 5) in the longitudinal direction X. The linking portion 43 has a rhombic shape having three bending portions 43B. The linking portion 43 functions as a bending part in which the connection portions connected to the bound portion 41 and the movable body portion 400 are also deformed.

The engaging member 4 includes initial position holding means that holds the engaging portion 40 at a predetermined initial position and that releases the holding in association with movement of the engaging portion 40 (movable body portion 400) from the initial position.

As shown in FIG. 5, the initial position holding means is a joint portion 44 that joins the main portion 410 of the bound portion 41 and the sliding portion 42 of the movable body portion 400 so as to be linked to each other. The joint portion 44 has at least one weakened portion 44W in at least a part of the linking section. The joint portion 44 is provided so as to link one of the main portions 410 positioned on both sides in the longitudinal direction X, and the end portion on the outer side in the longitudinal direction X of the sliding portion 42 extending on the same side. The joint portion 44 is formed in a substantially spherical shape, and the upper end and lower end thereof connected to the main portion 410 and the sliding portion 42 are weakened portions 44W having a small cross section relative to the remainder. When the movable body portion 400 moves relative to the bound portion 41, either one (or both) of the weakened portions 44W is cut, which enables the movement.

The engaging member 4 includes movement restricting means that restricts, when the movable body portion 400 moves relative to the bound portions 41, the movement in a predetermined range.

As shown in FIG. 1, first movement restricting means restricts, when the movable body portion 400 moves in the longitudinal direction X relative to the bound portions 41, the movement in a predetermined range X1. Here, the first movement restricting means includes the lower end portion 40D of the engaging portion 40, and inner end portions 41U which are end portions on the engaging portion 40 side of the bound portions 41. Movement in the longitudinal direction X of the movable body portion 400 is inhibited by the lower end portion 40D of the engaging portion 40 coming into contact with an inner end portion 41U of a bound portion 41. That is, the interval between the inner end portions 41U of the respective bound portions 41 is a movable range X1 of the movable body portion 400 relative to the bound portions 41.

Second movement restricting means restricts, when the movable body portion 400 moves in the width direction Y relative to the bound portions 41, the movement in a predetermined range Y1 (see FIG. 4). Here, the second movement restricting means includes the sliding portion 42 including the lower end portion 40D of the engaging portion 40, and the leg portions 411 of the bound portions 41. Movement in the width direction Y of the movable body portion 400 is inhibited by the sliding portion 42 coming into contact with the leg portions 411 on either one of both sides in the width direction Y. That is, the interval between the leg portions 411 on both sides in the width direction Y is a movable range Y1 of the movable body portion 400 relative to the bound portions 41.

Third movement restricting means restricts movement in the insertion direction Z (up-down direction) of the movable body portion 400 relative to the bound portions 41, in a predetermined range Z1 (see FIG. 3). The third movement restricting means is the wire routing material 3, the bound portions 41, and the sliding portion 42 interposed therebetween in the up-down direction. The interval between the wire routing material 3 and the bound portion 41 is a movable range Z1 of the movable body portion 400 relative to the bound portions 41.

The engaging portion 40 is formed so as to protrude on the flat wire routing material 3 side (area above the broken line Q in FIG. 6) of the engaging member 4, not from the flexible wire routing material 2 side, in a binding and holding state in which the flexible wire routing material 2 and the flat wire routing material 3 are bound and held together with the bound portions 41 by the binding members 5.

As shown in FIG. 7A, a head surface 40Ba (leading end surface on the front side in the insertion direction Z) of the engaging portion 40 in the case of the engaging portion 40 being inserted into the fixing hole 101H forms an inclined surface that is inclined so as to be closer to the rear side in the insertion direction Z toward the outer circumferential side. The head surface 40Ba forming the inclined surface is provided, with respect to the leading end of the engaging portion 40, not only on both sides in the longitudinal direction X but also on both sides in the width direction Y. Accordingly, as long as the leading end of the engaging portion 40 in the insertion direction Z is located inside the fixing hole 101H when the engaging portion 40 is inserted into the fixing hole 101H of the vehicle body 100, insertion of the engaging portion 40 proceeds, simply by pushing the engaging member 4 in the insertion direction Z, along a direction as indicated by, for example, an arrow Z0 according to the inner edge of the fixing hole 101H sliding on each head surface 40Ba that forms the inclined surface. Although the engaging portion 40 is pressed by the inner edge of the fixing hole 101H at this time, the positional movement thereof in the two directions X, Y is allowed as described above, and, therefore, the engaging portion 40 is allowed to reach a position at which the engaging portion 40 can be inserted, while changing its position during the pressing. Finally, the engaging portion 40 is assembled into the vehicle body 100 by being inserted and locked into the fixing hole 101H (see FIG. 7B). At the positional movement of the engaging portion 40 at this time, the joint portion 44 (weakened portion 44W) is cut due to the force applied thereto.

Although one embodiment of this invention has been described above, this embodiment is merely illustrative. This invention is not limited thereto, and various modifications such as additions and omissions may be made on the basis of the knowledge of a person skilled in the art without departing from the scope of the claims.

Hereinafter, other embodiments different from the above embodiment, and modifications thereof, will be described. Parts having the same functions as those in the above embodiment are denoted by the same reference characters, and the detailed description thereof is omitted. The above embodiment and the following modifications and other embodiments may be combined to be implemented as appropriate as long as no technical contradiction arises.

For example, in this invention, the flexible wire routing material 2 may be omitted, and only the flat wire routing material 3 may be used. Conversely, the flat wire routing material 3 may be omitted, and only the flexible wire routing material 2 may be used.

Although each binding member 5 of the above-described embodiment is a tape member, the binding member 5 may be another binding member. For example, the binding member 5 may be a belt member, such as a so-called tie band, that has a belt portion for enclosing the wire routing material, and a buckle portion for fixing both ends of the belt portion enclosing the wire routing material. Further, the binding members 5 of different types may be used on the first side in the longitudinal direction of the wire routing material and on the second side opposite to the first side.

Each linking portion 43 in the above-described embodiment is in a rhombic shape having the bending portions 43B. However, for example, as shown in a second embodiment in FIG. 8, the linking portion 43 may be in a quadrangle-like shape having two bending portions 43B each having a recessed groove formed in the inner side. The linking portion 43 may be an elastic deformation portion that can be elastically deformed. For example, as shown in a third embodiment in FIG. 9, the linking portion 43 may be formed as a semicircular elastic deformation portion (43). The linking portion 43 may be any type that links the bound portion 41 and the movable body portion 400 so as to allow relative movement therebetween. The linking portion 43 may be the above-described bending portion or elastic deformation portion, may be a deformation portion using the above-described bending portion and elastic deformation portion in combination, or may be realized by using another technique.

The joint portion 44 provided as the initial position holding means in the above-described embodiments may be in another form. Although the form of the joint portion 44 as in the above-described embodiments has two weakened portions 44W, it is sufficient that the joint portion 44 has at least one weakened portion 44W.

DESCRIPTION OF THE REFERENCE CHARACTERS 1 binding structure of a wire routing material
2 flexible wire routing material
3 flat wire routing material
4 engaging member
4S gap
40 engaging portion
41 bound portion
42 sliding portion
400 movable body portion
410 main portion
411 leg portion
5 binding member
10 assembling structure for engaging member
X longitudinal direction
Y width direction
Z insertion direction

What is claimed is:
1. An engaging member comprising:
a movable body portion including an engaging portion for assembly into a vehicle body; and
a bound portion configured to be caused to come into a binding and holding state together with a wire routing material in an elongated shape by a binding member, wherein
the bound portion integrally includes
a main portion configured to be pressed, in the binding and holding state, toward the wire routing material side by the binding member, and
a leg portion which, while in the binding and holding state, extends from the main portion and is in contact with the wire routing material to ensure a gap between the main portion and the wire routing material facing the main portion, and
the movable body portion integrally includes the engaging portion and a sliding portion that is disposed in the gap between the main portion and the wire routing material, the sliding portion further configured to slide on the wire routing material in a state of being in contact with the wire routing material, and the sliding allows a position of the engaging portion to be moved relative to the bound portion bound and held together with the wire routing material.

2. A binding structure of a wire routing material, the binding structure comprising:
a wire routing material in an elongated shape;

a binding member configured to bind the wire routing material; and an engaging member including a movable body portion including an engaging portion for assembly into a vehicle body, and a bound portion configured to be caused to come into a binding and holding state together with the wire routing material by the binding member, wherein the bound portion integrally includes a main portion configured to be pressed, in the binding and holding state, toward the wire routing material side by the binding member, and a leg portion which, while in the binding and holding state, extends from the main portion and is in contact with the wire routing material to ensure a gap between the main portion and the wire routing material facing the main portion, and the movable body portion integrally includes the engaging portion and a sliding portion that is disposed in the gap between the main portion and the wire routing material, the sliding portion further configured to slide on the wire routing material in a state of being in contact with the wire routing material, and the sliding allows a position of the engaging portion to be moved relative to the bound portion bound and held together with the wire routing material.

3. A binding structure of a wire routing material, the binding structure comprising:

a wire routing material in an elongated shape;

a binding member configured to bind the wire routing material; and an engaging member including a movable body portion including an engaging portion for assembly into a vehicle body, and a bound portion configured to be caused to come into a binding and holding state together with the wire routing material by the binding member, wherein the bound portion integrally includes a main portion configured to be pressed, in the binding and holding state, toward the wire routing material side by the binding member, and a leg portion which, while in the binding and holding state, extends from the main portion and is in contact with the wire routing material to ensure a gap between the main portion and the wire routing material facing the main portion, and the movable body portion integrally includes the engaging portion, and a sliding portion disposed such that sliding of the sliding portion is allowed on the wire routing material in the gap, and the sliding allows a position of the engaging portion to be moved relative to the bound portion bound and held together with the wire routing material, wherein the engaging member includes a linking portion configured to link the bound portion and the movable body portion so as to allow relative movement therebetween.

4. The binding structure of the wire routing material according to claim 3, wherein the linking portion is a deformation portion configured to deform in association with the relative movement.

5. The binding structure of the wire routing material according to claim 2, wherein the engaging member includes initial position holding means configured to hold the engaging portion at a predetermined initial position and to release holding of the engaging portion in association with movement of the engaging portion from the initial position.

\* \* \* \* \*